Figure 1:
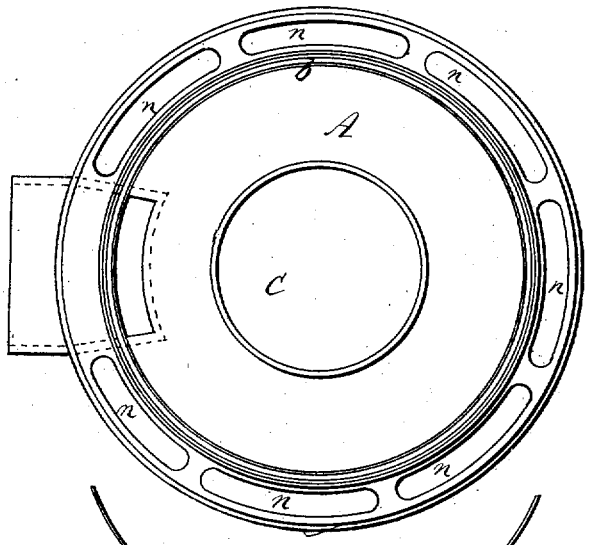

2 Sheets--Sheet 1.

G. E. THROOP.

Grain-Cleaning Machine.

No. 6,629. Reissued Sept. 7, 1875.

Witnesses

J. J. Greenough
A. Thompson

Inventor

G. E. Throop

N. PETERS, PHOTO-LITHOGRAPHER, WASHINGTON, D. C.

2 Sheets--Sheet 2.

G. E. THROOP.

Grain-Cleaning Machine.

No. 6,629.

Reissued Sept. 7, 1875.

Witnesses:

J. J. Greenough
A. Thompson

Inventor:

G. E. Throop

N. PETERS, PHOTO-LITHOGRAPHER, WASHINGTON, D. C.

UNITED STATES PATENT OFFICE.

GARDNER E. THROOP, OF SYRACUSE, NEW YORK.

IMPROVEMENT IN GRAIN-CLEANING MACHINES.

Specification forming part of Letters Patent No. 135,675, dated February 11, 1873; reissue No. 6,629, dated September 7, 1875; application filed June 3, 1874.

*To all whom it may concern:*

Be it known that I, GARDNER E. THROOP, of the city of Syracuse, in the county of Onondaga and State of New York, have invented certain Improvements in Machinery for Cleaning Wheat, Rice, and other farinaceous seeds, &c., of which the following is a specification:

My present improvements relate to cylindrical brushing-machines, a part of which are adapted to smut-machines, and other grain-cleaners, &c., heretofore invented.

In a machine employing a revolving brush for cleaning grain and other analogous things, it is essential that the space between the brush and the surrounding case should be within certain limits to produce the best effect upon the grain, but the fiber of which the brush is made is constantly wearing away, and eventually decreases its efficient action. I find, if the brushes are set in rows, leaving spaces between them, the action of the grain upon the sides of the fiber of the brush soon cuts it out and destroys its action, while the wear is much less rapid if a continuous surface of the ends of the fiber is presented to the grain passing through. To remedy the defects arising from the wear of brushes, as heretofore made, I make the whole of the exterior surface of the brush continuous, setting the fibers composing it into a continuous hollow cylinder of wood, the insertion being so close as to form on the exterior a continuous surface of the ends of the fibers, without any spaces, that the grain can enter to strike the sides of the fibers. In this way I keep the wear directly upon the ends of the fibers, and thus wear them off equally all around. This, however, enlarges the space between the case and the ends of the brush too much. To reduce this, with a brush of equal diameter at top and bottom, the perforated case, made of any suitable material, with small openings through it, must be contracted as the brush wears away, so as to maintain the proper space between them until the fibers of the brush are worn out. My invention further consists in causing a strong current of air to pass through openings *n n* by separating the cleaning-chamber from the fan-chamber C below, in which the fan *f* revolves on the center or brush-shaft, and forces the current of air upward through said openings, that prevents clogging at that point, which would otherwise take place if the air had a different outlet, as in machines having the auxiliary fan-chamber and cleaning-chamber united.

These deficiencies I overcome by the following construction with reference to the accompanying drawing, in which—

Figure 4:
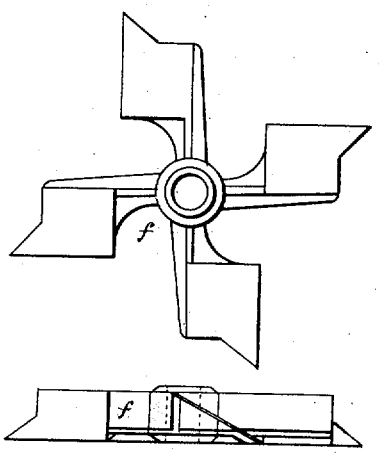
Figure 2:
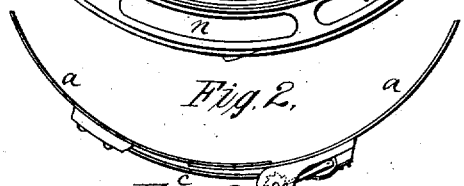
Figure 3:
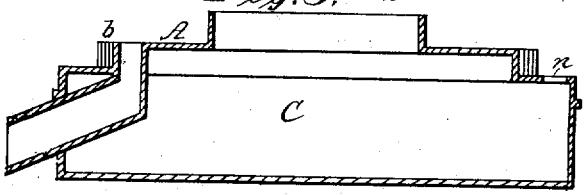

A, Figs. 1 and 3, shows a plan and section of the lower head of the case. It consists of the collared center closing a fan-chamber, C, below, through which the center shaft passes; and beyond this there is a concentric offset, *b*, with a series of four, more or less, rings around it, as seen in the drawing, by which its diameter is increased. The perforated case is drawn tightly around the outer ring below, and similar ones at the upper head. The rings hold the case at a proper distance from the ends of the brush when new, the edges of the case overlapping, and being held together by adjustable fastenings, made in any convenient way, to contract and hold the case together. In Fig. 2 a thin strip of metal, *c*, is shown, affixed to the edge of the case *a*, and wound around a small cylinder, *d*, on the other edge of case *a*, with a ratchet and pawl to hold it. When the revolving brush is worn off, leaving too much space between it and the case *a*, the outer rings at *b* are removed, and the case again contracted around the next ring, which, in its turn, is removed. On the further wearing of the brush, this operation is again repeated until all the rings are removed and the brush is worn out. Thus, by a simple and cheap device, the cost of a new brush is saved by each contraction of the case. Beyond the perforated case there is a close case fitted around the periphery of the head A, in which, between the two cases, there are openings *n n* connecting the space *k* between the two cylinders and the fan-chamber C below, containing the auxiliary fan *f*, mounted on the central or brush-shaft, with which it revolves. This fan *f* has inclined vanes, so formed as to cause a strong upward current of air through the openings *n n* and space *k*. A plan of this fan is seen in Fig. 4. The current of air thus produced throws upward the foreign matter forced through the perforated case into space *k*, which is drawn off by the exhaust-fan above, to which the lower fan is auxiliary—a distinguishing feature of my invention.

The head A separates the fan-chamber C from the cleaning-chamber in such a way that the grain does not pass down through it, but is led off through a spout on one side, cut off separately from the fan-chamber. By this construction an unobstructed free blast is made to circulate through the air-spaces in the machine, and clear it of all the dust, chaff, &c., as fast as it is detached, and with great economy of power.

It will be noticed that the lower fan-chamber is separated from that in which the brush revolves by the head A, and that the entire blast from the auxiliary fan is driven up through the openings *n n*.

Figure 5:
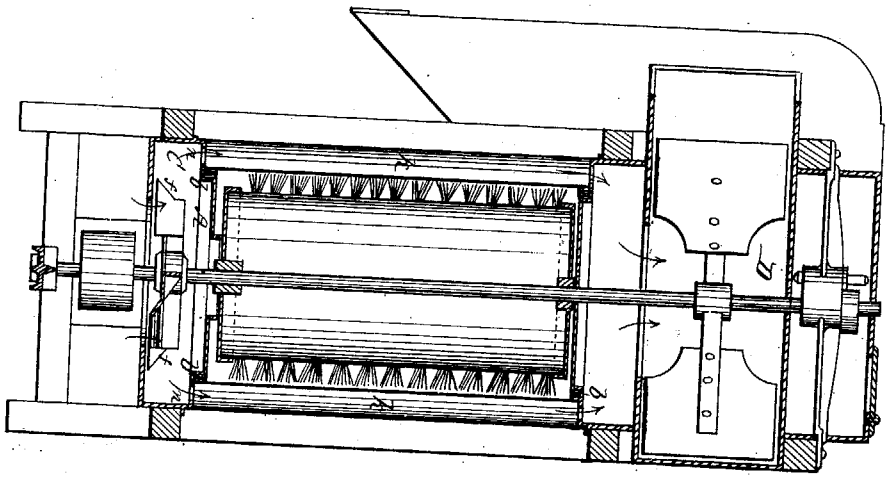

Fig. 5 is a vertical section through the entire machine, showing the various parts in proper relative position.

I have not fully described or represented the well-down parts of a smut-machine or brush-machine, as they are largely in public use, and may be found in the patents heretofore granted to me December 22, 1863, and April 2, 1867.

Having thus fully described my improvements, I claim—

1. In combination with a revolving cleaning apparatus, a contracting case and head A, having on them concentric rings of various diameters, around which the contracting case is drawn and gradually reduced in size as the brush wears away, substantially as and for the purposes herein set forth.

2. In combination with a contracting cylinder, a revolving brush, having a solid or continuous surface, substantially as set forth.

3. The fan-chamber C, disconnected from the cleaning-chamber, for the purposes herein set forth, with openings *n n* around its head A, and the feather-bladed fan-wheel *f*, as shown, so combined as to direct the auxiliary blast upward through the annular space *k* and air-flues, all as herein specified.

GARDNER E. THROOP.

Witnesses:

LAWRENCE T. JONES,
J. J. GREENOUGH.

BEST AVAILABLE COPY